(12) United States Patent
Ono et al.

(10) Patent No.: US 8,754,181 B2
(45) Date of Patent: Jun. 17, 2014

(54) SILICONE RESIN, PROCESS FOR PRODUCING THE SAME, AND CURABLE RESIN COMPOSITION COMPRISING THE SAME

(75) Inventors: Yuki Ono, Kisarazu (JP); Masayoshi Isozaki, Kisarazu (JP); Takashi Saito, Kisarazu (JP)

(73) Assignee: Nippon Steel & Sumikin Chemical Co., Ltd., Tokyo (JP)

( * ) Notice: Subject to any disclaimer, the term of this patent is extended or adjusted under 35 U.S.C. 154(b) by 134 days.

(21) Appl. No.: 12/864,684

(22) PCT Filed: Feb. 4, 2009

(86) PCT No.: PCT/JP2009/051882
§ 371 (c)(1),
(2), (4) Date: Jul. 27, 2010

(87) PCT Pub. No.: WO2009/099099
PCT Pub. Date: Aug. 13, 2009

(65) Prior Publication Data
US 2010/0311919 A1    Dec. 9, 2010

(30) Foreign Application Priority Data

Feb. 7, 2008    (JP) ................................. 2008-027394
Feb. 7, 2008    (JP) ................................. 2008-027395

(51) Int. Cl.
*C08G 77/20*    (2006.01)
*C08F 283/12*    (2006.01)

(52) U.S. Cl.
USPC ............................. 528/25; 528/32; 525/479

(58) Field of Classification Search
USPC ...................................... 528/25, 32; 525/479
See application file for complete search history.

(56) References Cited

U.S. PATENT DOCUMENTS 5,270,423 A * 12/1993 Brown et al. .................... 528/15
5,331,020 A *  7/1994 Brown et al. .................... 522/99

(Continued)

FOREIGN PATENT DOCUMENTS

JP    4-352793 A    12/1992
JP    10-158400 A    6/1998

(Continued)

OTHER PUBLICATIONS

Noll, Walter. Chemistry and Technology of Silicones. Academic Press, New York. Evidentiary Reference.*

(Continued)

*Primary Examiner* — Mike M Dollinger
(74) *Attorney, Agent, or Firm* — Cheng Law Group, PLLC (57) ABSTRACT

Provided are a silicone resin that yields a cured product excellent in flexibility, toughness, and heat resistance and high in transparency, a process for producing the said silicone resin, and a curable resin composition comprising the said silicone resin. The silicone resin is obtained by reacting an organopolysiloxane containing SiH groups represented by general formula (3) with an organopolysiloxane containing hydroxyl groups at both ends represented by general formula (5) and an alcohol containing radically reactive groups represented by general formula (6) in the presence of a hydroxylamine compound represented by general formula (4) as a catalyst and this silicone resin is used in formulating a curable resin composition. In the general formulas, R is an alkyl group of 1-12 carbon atoms optionally containing an oxygen atom or an aryl group, $R^1$ is an alkyl group, Y is a hydrocarbon group of 1-12 carbon atoms optionally containing an oxygen atom, Z is a (meth)acryloyl group, a vinyl group, or an allyl group, and n, s, m, and r are numbers respectively expressed as $0 < n \le 2{,}000$, $0 < s \le 100$, $0 < m \le 1{,}000$, and $1 < r \le 6$.

4 Claims, 3 Drawing Sheets

(56) References Cited

U.S. PATENT DOCUMENTS

| | | | |
|---|---|---|---|
| 5,594,042 A * | 1/1997 | Glover et al. | 522/31 |
| 5,624,762 A * | 4/1997 | Glover et al. | 428/447 |
| 5,824,761 A * | 10/1998 | Bujanowski et al. | 528/25 |
| 5,861,467 A * | 1/1999 | Bujanowski et al. | 528/15 |
| 5,866,666 A * | 2/1999 | Herzig et al. | 528/25 |
| 2006/0058486 A1* | 3/2006 | Lautenschlager | 528/31 |

FOREIGN PATENT DOCUMENTS

| | | | |
|---|---|---|---|
| JP | 2002-302664 A | 10/2002 | |
| JP | 2007-126576 A | 5/2007 | |
| JP | 2008-266301 A | 11/2008 | |
| JP | 2008-274272 A | 11/2008 | |

OTHER PUBLICATIONS

Noll, Walter. Chemistry and Technology of Silicones. Academic Press, New York. Evidentiary Reference. Sep. 28, 1968.*

International Search Report for the Application No. PCT/JP2009/051882 mailed May 19, 2009.

International Preliminary Report on Patentability for Application No. PCT/JP2009/051882 mailed Sep. 16, 2010.

* cited by examiner

SILICONE RESIN, PROCESS FOR PRODUCING THE SAME, AND CURABLE RESIN COMPOSITION COMPRISING THE SAME

FIELD OF TECHNOLOGY

This invention relates to a silicone resin, a process for producing the said silicone resin, and a curable resin composition comprising the said silicone resin and, more particularly, this invention relates to a novel silicone resin that is crosslinked by silanols in spite of the co-presence of radically reactive groups, a process for producing the said silicone resin, and a curable resin composition comprising the said silicone resin.

BACKGROUND TECHNOLOGY

Cured silicone resins show excellent heat resistance, weather resistance, oil resistance, low-temperature resistance, and electric insulation and, at the same time, low modulus of elasticity and low stress. In consequence, cured silicone resins are used in a wide variety of applications including protection of electronic parts installed in vehicles and electrical appliances. In recent years, there is a demand especially for cured silicone resins which are flexible and tough.

In order to obtain cured silicone resins, curable reactive functional groups are generally introduced to silicone resins. In particular, in order to obtain cured products which are flexible and tough, silicone resins are synthesized by utilizing such means as introduction of long silicone chains and optimization of the number of functional groups or produced in the form of polymer blends by mixing resins.

The processes such as the following have been used for the synthesis of silicone resins up to the present: condensation of silanols; linking of readily hydrolyzable groups such as aminoxy groups, alkoxy groups, and oxime groups to the siloxane chain followed by polycondensation in the presence of atmospheric moisture; condensation reaction with the use of chlorosilanes; and hydrosilylation reaction between a compound in which a hydrogen atom is linked to a silicon atom and a compound in which an unsaturated aliphatic hydrocarbon group such as a vinyl group and an ally group is linked to a silicon atom in the presence of a Group 8 compound as a catalyst.

However, it is difficult to introduce curable reactive groups selectively according to the aforementioned processes based on polycondensation. Further, it is a matter of concern that the resins thereby obtained are apt to increase in viscosity or to gel and their storage stability is questionable. Now, addition of tertiary amines is proposed as a measure to suppress increase in viscosity and gelation of the resins prepared by the hydrosilylation reaction; however, even this measure could not fully suppress increase in viscosity and gelation of the silicone resins during the course of purification where heat is applied under reduced pressure (refer to patent document 1).

An example of a silicone resin containing curable reactive functional groups is afforded by a silicone resin in which radically reactive methacryl groups are introduced to the silicone chain; however, a resin containing methacryl groups at both ends undergoes crosslinking at fewer places to yield a product which tends to break easily (refer to patent document 2).

When the technique of polymer blending is used, the compatibility of polymers to be blended poses a problem. When the polymers do not melt into one another, the resulting blend becomes turbid and it cannot be used as an optical material. Blends of polymers whose monomers are mainly composed of carbon-chain compounds face a problem that the cured products turn yellow at high temperatures. Hence, a demand has been created for development of silicone resins in whose silicone chains are selectively introduced arbitrarily long silicone chains and an arbitrary number and kind of curable reactive groups so that the resins can yield cured products with excellent flexibility, toughness, heat resistance, and transparency.

Materials of low birefringence, low optical modulus of elasticity, and high optical transparency are used as optical materials in such applications as bases of liquid crystal display devices, optical lenses, and encapsulating materials for light emitting diodes. Moreover, the manufacturing process necessitates that the materials intended for use in bases of liquid crystal display devices and optical lenses have high heat resistance. Glass has been used as a material that satisfies the aforementioned requirements.

However, curved surfaces are used in optical lenses and, in recent years, a demand is growing for increasingly thinner bases for liquid crystal display devices. Glass hitherto used in these applications has a problem in strength because of its brittleness and this property has begun to limit the area of applications of glass.

Polymers are considered tough materials, but they generally show low heat resistance. As a measure to provide polymers with high heat resistance, introduction of an aromatic skeleton is under study, for example, in the case of thermoplastic resins. However, this measure leads to an increase in birefringence and optical modulus of elasticity on the other hand and it is difficult for a given thermoplastic resin to show both high heat resistance and good optical properties simultaneously. Furthermore, in the case of thermosetting resins, those known thus far are reported to become colored during heat curing and they are not suitable for use as optical materials. For example, acrylic resins have a property of rapid curing, but they occasionally become colored on heating because of their low heat resistance.

Silicone resins are generally known as materials of excellent heat resistance and high transparency and they are useful as highly flexible materials as well. However, the curable silicone resins known thus far require high temperature and long time in curing and have the disadvantage of low productivity. For example, in a document which describes curing by hydrosilylation of silicone resins, a specimen cures at a high temperature of 60° C. in 1 hour or at room temperature in a long time of 24 hours (refer to patent document 3).

Patent document 1: JP Hei 4-352793 A
Patent document 2: JP2002-302664 A
Patent document 3: JP2007-126576 A

DISCLOSURE OF THE INVENTION

Problems to be Solved by the Invention

Under the aforementioned circumstances, the inventors of this invention have conducted intensive studies aiming at obtaining novel silicone resins in whose silicone chains are selectively introduced arbitrarily long silicone chains and an arbitrary number and kind of curable reactive groups so that the resins can yield cured products with excellent flexibility, toughness, heat resistance, and transparency. As a result, they have found that silicone resins capable of achieving the aforementioned aim are obtained by mixing a polysiloxane containing SiH groups and an organopolysiloxane containing hydroxyl groups and allowing the mixture to react in the presence of a hydroxylamine compound. Further, they have found that resin compositions comprising the novel silicone resins cure while satisfying the requirements of both heat resistance and rapid curability to yield products of excellent transparency and toughness.

Accordingly, an object of this invention is to provide a silicone resin which can yield a cured product showing excellent flexibility, toughness, heat resistance, and transparency. Another object of this invention is to provide a process for producing the said silicone resin.

Further, a still another object of this invention is to provide a curable resin composition which can yield a molded article (cured product) which is highly heat-resistant, transparent with good light transmission, and yet tough.

Means to Solve the Problems

Thus, this invention relates to a silicone resin containing radically reactive groups represented by the following general formula (1):

(1)

wherein R is an alkyl group of 1-12 carbon atoms optionally containing an oxygen atom or an aryl group, $0<l\leq100$, $0\leq m\leq1{,}000$, $0<n\leq2{,}000$, $0<o\leq100-l$, $p\geq0$, $q\leq100-l-o$, and X is a monovalent group containing at least 1 unsaturated linkage represented by the following general formula (2);

X: —O(Y)(Z)$_r$ (2)

wherein Y is a hydrocarbon group of 1-12 carbon atoms optionally containing an oxygen atom, Z is a (meth)acryloyl group, a vinyl group, or an allyl group, and r is a number expressed as $1\leq r\leq6$.

Further, this invention relates to a process for producing a silicone resin containing radically reactive groups which comprises reacting an organopolysiloxane containing SiH groups represented by the following general formula (3)

(3)

(wherein R is an alkyl group of 1-12 carbon atoms optionally containing an oxygen atom or an aryl group, and s and in are numbers respectively expressed as $0<s\leq100$ and $0<m\leq1{,}000$) in the presence of a hydroxylamine compound represented by the following general formula (4) as a catalyst

HONR$^1_2$ (4)

(wherein R$^1$ is an alkyl group) with an organopolysiloxane containing hydroxyl groups at both ends represented by the following general formula (5)

(5)

(wherein R is an alkyl group of 1-12 carbon atoms optionally containing an oxygen atom or an aryl group and n is a number expressed as $0<n\leq2{,}000$) and with an alcohol containing radically reactive groups represented by the following general formula (6)

HO(Y)(Z)$_r$ (6)

(wherein Y is a hydrocarbon group of 1-12 carbon atoms optionally containing an oxygen atom, Z is a (meth)acryloyl group, a vinyl group, or an allyl group, and r is a number expressed as $1\leq r\leq6$).

Further, this invention relates to a curable resin composition comprising the curable silicone resin containing radically reactive groups represented by the aforementioned general formula (1) and a radical polymerization initiator.

Still further, this invention relates to a molded silicone resin article obtained by radical copolymerization of the aforementioned curable resin composition.

First, this invention will be explained concretely with reference to an example of the production of a silicone resin containing radically reactive groups. The process for producing a silicone resin according to this invention comprises reacting an organopolysiloxane containing SiH groups with an organopolysiloxane containing hydroxyl groups and an alcohol containing radically reactive groups in the presence of a hydroxylamine compound. In the sequence of reactions shown below, the organopolysiloxane containing SiH groups is reacted first with the organopolysiloxane containing hydroxyl groups and then with the alcohol containing radically reactive groups. Alternatively, the organopolysiloxane containing SiH groups is reacted first with the alcohol containing radically reactive groups and then with the organopolysiloxne containing hydroxyl groups. Or, the organopolysiloxane containing SiH groups may be reacted simultaneously with the organopolysiloxne containing hydroxyl groups and the alcohol containing radically reactive groups.

(1)

In the formulas, R is an alkyl group of 1-12 carbon atoms optionally containing an oxygen atom or an aryl group, $R^1$ is an alkyl group; s and m are numbers respectively expressed as $0<s\leq100$ and $0<m\leq1,000$ and $0<l\leq100$, $0<n\leq2,000$, $0<o<100-l$, $p\geq0$, and $q\leq100-1-o$; X is a monovalent group containing at least 1 unsaturated linkage represented by the following general formula (2)

X: —O(Y)(Z)$_r$    (2)

wherein Y is a hydrocarbon group of 1-12 carbon atoms optionally containing an oxygen atom, Z is a (meth)acryloyl group, a vinyl group, or an allyl group, and $1\leq r\leq6$.

A compound represented by the following general formula (3) is used as the aforementioned organopolysiloxane containing SiH groups;

wherein R is an alkyl group of 1-12 carbon atoms optionally containing an oxygen atom or an aryl group, $0<s\leq100$, and $0<m\leq1,000$.

Examples of the group R in general formula (3) include an alkyl group, a cycloalkyl group, an aryl group, an alkenyl group, and an aralkyl group and any of the foregoing groups in which hydrogen atoms are partly or wholly replaced by a halogen atom, a cyano group, and the like. However, in consideration of the necessity of removing the by-product $R^1_2NOH$ after the reaction of a compound represented by general formula (3) with a siloxane containing hydroxyl groups as will be described later, the group R is preferably an alkyl group of 1-6 carbon atoms such as a methyl group, an ethyl group, and a propyl group.

The numbers s and m in general formula (3) are respectively expressed as $0<s\leq100$ and $0<m\leq1,000$. When s exceeds 100, the cured product becomes hard. When m exceeds 1,000, the reactivity at the time of synthesis drops. Preferably, s=3-50 and m=5-500. A mixture of two kinds or more of organopolysiloxanes represented by general formula (3), differing in R, s, and m from one another, may be used in the synthesis.

An organopolysiloxane represented by general formula (3) can be produced by a known process. For example, this polymer can be obtained easily by allowing octamethylcyclotetrasiloxane and/or tetramethylcyclotetrasiloxane and a compound containing a triorganosilyl group which can become a terminal group to react in the presence of a catalyst such as sulfuric acid, trifluormethanesulfonic acid, and methanesulfonic acid at a temperature in the range of −10° C. to 40° C. until equilibrium is attained. An example of the aforementioned compound containing a triorganosilyl group is hexamethyldisiloxane.

A hydroxylamine represented by the following general formula (4) can be used in the synthesis of a silicone resin according to this invention;

wherein $R^1$ is an alkyl group.

The aforementioned hydroxylamine behaves like a catalyst in the subsequent reactions and is finally removed from the system. Hence, the mixing ratio will be shown below on the basis of the SiH group of an organopolysiloxane represented by general formula (3).

The ratio of hydroxylamine represented by general formula (4) to the organopolysiloxane containing SiH groups represented by general formula (3) at the time of mixing is not specifically limited, but the molar ratio (k) of the hydroxylamine to the SiH group of the organopolysiloxane containing SiH groups represented by general formula (3) is preferably greater than 0, particularly in the range of 0.1 to 1. When the aforementioned molar ratio k exceeds 1, an excess of the hydroxylamine remains in the reaction system and the problem of stability with passage of time remains. The aforementioned reaction of the organopolysiloxane represented by general formula (3) with the hydroxylamine represented by general formula (4) is carried out with stirring at a temperature in the range of 0-100° C., preferably in the range of 20-50° C., for a period in the range of 10 minutes to 24 hours or so while confirming the introduction of amine by $^1$H-NMR analysis.

A polysiloxane containing hydroxyl groups exclusively at both ends represented by the following general formula (5) is preferably added as the aforementioned organopolysiloxane containing hydroxyl groups:

(5)

wherein R is an alkyl group of 1-12 carbon atoms optionally containing an oxygen atom or an aryl group and 0<n≤2,000.

The degree of polymerization n of a mixture of polysiloxanes denotes the mean value and preferably 0<n≤2,000 in consideration of the physical strength of the polysiloxane copolymer to be obtained. When n exceeds 2,000, the reactivity during the synthesis drops. The aforementioned organopolysiloxane containing hydroxyl groups represented by general formula (5) can be produced by a known process; for example, a cyclosiloxane compound is reacted with a variety of organic lithium reagents and hexamethylcyclotrisiloxane and then reacted with a chlorosilane to yield the desired organopolysiloxane containing hydroxyl groups.

According to this invention, the proportion of an organopolysiloxane containing hydroxyl groups represented by general formula (5) in the reaction mixture is not specifically limited and the molar ratio of the hydroxyl group of the organopolysiloxane containing hydroxyl groups to the SiH group of the organopolysiloxane containing SiH groups in the charging stage is greater than 0, preferably in the range of 0.01 to less than 1, more preferably in the range of 0.01 to 0.5. When the aforementioned molar ratio exceeds 1, an excess of hydroxyl groups remains in the reaction system and the problem of stability with passage of time remains. The reaction at the time of addition of the organopolysiloxane containing hydroxyl groups is allowed to proceed with stirring at a temperature in the range of 0-100° C., preferably in the range of 20-50° C., for a period in the range of 10 minutes to 24 hours or so while confirming the disappearance of SiOH groups by $^1$H-NMR analysis.

Addition of an alcohol containing radically reactive groups represented by the following general formula (6)

HO(Y)(Z)$_r$ (6)

(wherein Y is a hydrocarbon group of 1-12 carbon atoms optionally containing an oxygen atom, Z is a (meth)acryloyl group, a vinyl group, or an allyl group, and 1≤r≤6) leads to the production of a silicone resin containing radically reactive groups represented by the following general formula (1):

(1)

Examples of the alcohols represented by general formula (6) include 2-acryloyloxyethyl-2-hydroxyethyl phthalate, 2-methacryloyloxyethyl-2-hydroxyethyl phthalate, 2-hydroxybutyl acrylate, 2-hydroxybutyl methacrylate, 2-hydroxyethyl acrylate, 2-hydroxyethyl methacrylate, 2-hydroxypropyl acrylate, 2-hydroxypropyl methacrylate, aliphatic epoxy acrylates, aliphatic epoxy methacrylates, Ebecryl 111, Ebecryl 112, ECH-modified allyl acrylate, ECH-modified allyl methacrylate, butanediol monoacrylate, butanediol monomethacrylate, caprolactone acrylate, caprolactone methacrylate, dipropylene glycol acrylate, dipropylene glycol methacrylate, ECH-modified phenoxy acrylate, ECH-modified phenoxy methacrylate, polypropylene glycol acrylate, polypropylene glycol methacrylate, EO-modified 1,6-hexane diol diacrylate, EO-modified 1,6-hexanediol dimethacrylate, ECH-modified 1,6-hexanediol diacrylate, ECH-modified 1,6-hexanediol dimethacrylate, bisphenol A-diepoxy-acrylic acid adduct, bisphenol A-diepoxy-methacrylic acid adduct, stearic acid-modified pentaerythritol diacrylate, stearic acid-modified pentaerythritol dimethacrylate, ECH-modified phthalic acid diacrylate, ECH-modified phthalic acid dimethacrylate, ECH-modified propylene glycol diacrylate, ECH-modified propylene glycol dimethacrylate, PO-modified bisphenol A diglycidyl ether diacrylate, PO-modified bisphenol A diglycidyl ether dimethacrylate, triglycerol diacrylate, triglycerol dimethacrylate, ECH-modified glycerol triacrylate, ECH-modified glycerol trimethacrylate, pentaerythritol triacrylate, pentaerythritol trimethacrylate, dipentaerythritol hydroxypentaacrylate, dipentaerythritol hydroxypentamethacrylate, 2-hydroxy-3-acryloyloxypropyl acrylate, 2-hydroxy-3-acryloyloxypropyl methacrylate, 2-hydroxy-3-acryloyloxypropyltrimethylammonium chloride, 3-chloro-2-hydroxypropyl acrylate, 3-chloro-2-hydroxypropyl methacrylate, glycerol acrylate, glycerol methacrylate, glycidyl acrylate, glycidyl methacrylate, EO- and PO-modified phthalic acid acrylate, EO- and PO-modified phthalic acid methacrylate, EO-modified phthalic acid acrylate, EO-modified phthalic acid methacrylate, polyethylene glycol-polypropylene glycol acrylate, polyethylene glycol-polypropylene glycol methacrylate, poly(ethylene glycol-tetramethylene glycol) acrylate, poly(ethylene glycol-tetramethylene glycol) methacrylate, poly(propylene glycol-tetramethylene glycol) acrylate, poly(propylene glycol-tetramethylene glycol) methacrylate, polyethylene glycol acrylate, polyethylene glycol methacrylate, ECH-modified ethylene glycol diacrylate, ECH-modified ethylene glycol dimethacrylate, glycerol acrylate methacrylate, glycerol diacrylate, glycerol dimethacrylate, ECH-modified phenoxy diacrylate, ECH-modified phenoxy dimethacrylate, ECH-modified polyethylene glycol diacrylate, ECH-modified polyethylene glycol dimethacrylate, cyclohexanedimethanol monovinyl ether, diethylene glycol monovinyl ether, hydroxybutyl vinyl ether, hydroxyethyl vinyl ether, vinyl 4-hydroxybutyl ether, and 3-ethyl-3-hydroxyethyloxetane.

The reaction at the time of addition of the aforementioned alcohol containing radically reactive groups represented by general formula (6) is carried out at a temperature in the range of 0-100° C., preferably in the range of 20-50° C., for a period in the range of 10 minutes to 24 hours or so while confirming the introduction of radically reactive groups by $^1$H-NMR analysis. The proportion of the alcohol containing radically reactive groups represented by general formula (6) in the reaction mixture is not specifically limited, but the molar ratio of the hydroxyl group of the alcohol containing radically reactive groups represented by general formula (6) to the SiH group of the organopolysiloxane containing SiH groups represented by general formula (3) in the charging stage is 0.5 or more, preferably in the range of 0.8 to 3.

The silicone resin containing radically reactive groups represented by general formula (1) obtained in this manner can be crosslinked by irradiation with ultraviolet light using a low-pressure mercury lamp. Furthermore, crosslinking can be effected by hydrosilylation using another polysiloxane containing SiH groups. In the case where the silicone resin represented by general formula (1) contains SiH groups, crosslinking can be effected by hydrosilylation with a polysiloxane containing aliphatic unsaturated groups such as vinyl groups. Moreover, the silicone resin represented by general formula (1) thus obtained preferably has a weight average molecular weight (Mw) in the range of 10,000-200,000. A weight average molecular weight of lower than this range is undesirable as it tends to lower the mechanical strength after curing. A weight average molecular weight of higher than this range is also undesirable as it causes the viscosity to increase to a level too high for easy handling of the resin.

The silicone resin represented by general formula (1) obtained in the aforementioned manner possesses characteristic properties of both silicone resins and acrylic resins, namely, excellent flexibility and impact resistance of the former and rapid curability of the latter. A resin composition formulated by combining this silicone resin with a radical polymerization initiator that generates radicals by light or heat cures in a short time to yield a molded article which is heat-resistant, transparent, flexible, and impact-resistant.

The photopolymerization initiators which generate radicals by light include biacetylacetophenone, benzophenone, benzil, benzoyl isobutyl ether, benzyl dimethyl ketal, 1-hydroxycyclohexyl phenyl ketone, 1-hydroxy-1-methylethyl phenyl ketone, α-hydroxyisopropyl p-isopropylphenyl ketone, diethylthioxantone, ethylanthraquinone, and bis(diethylamino)benzophenone.

The thermal polymerization initiators which generate radicals by heat include a variety of organic peroxides such as ketone peroxides, diacyl peroxides, hydroperoxides, dialkyl peroxides, peroxy ketals, alkyl peresters, and percarbonates and dialkyl peroxides are preferred from the viewpoint of catalytic activity. Specific examples include cyclohexanone peroxide, 1,1-bis(t-hexaperoxy)cyclohexanone, cumene hydroperoxide, dicumyl peroxide, benzoyl peroxide, diisopropyl peroxide, di-t-butyl peroxide, t-hexylperoxyisopropyl monocarbonate, and t-butyl peroxy-2-ethylhexanoate. The thermal polymerization initiators useful for this invention are not limited to the examples given above. These thermal polymerization initiators may be used singly or as a mixture of two kinds or more.

The amount of the radical polymerization initiator to be incorporated is not specifically limited as long as the amount added is enough to produce the anticipated effect effectively and it is normally 0.01-20.0 parts by weight, preferably 0.1-10.0 parts by weight, per 100 parts by weight of the total polymerizable components. The term "total polymerizable components" here means the sum total of the silicone resin containing radically reactive groups of this invention described above and other compounds containing polymerizable unsaturated groups at ends which are added, if necessary, as will be explained below. The compounds containing polymerizable unsaturated groups are meant to be copolymerizable with the silicone resin containing radically reactive groups of this invention.

That is, a curable resin composition may be formulated by using the silicone resin containing radically reactive groups of this invention together with monomeric (meth)acrylate ester as a "compound containing polymerizable unsaturated groups at ends" as long as this simultaneous use does not destroy the effect of this invention; specific examples of the (meth)acrylate esters include monoesters such as methyl (meth)acrylate and 2-hydroxyethyl (meth)acrylate, diesters such as 1,6-hexanediol di(meth)acrylate and 1,9-nonanediol di(meth)acrylate, triesters such as trimethylolpropane tri (meth)acrylate, and urethane acrylates.

Further, in formulating a curable resin composition in this invention, it is allowable to incorporate substances other than "a silicone resin containing radically reactive groups" and "a compound containing polymerizable unsaturated groups at ends." Examples of such substances include "other resins" such as polyamide, polyamideimide, polyurethane, polybutadiene, polychloroprene, polyether, polyester, styrene-butadiene-styrene block copolymer, petroleum resin, xylene resin, epoxy resin, ketone resin, cellulose resin, fluorine-containing oligomer, silicone oligomer, polysulfide oligomer, acrylic rubber, and silicone rubber, "fillers" such as silica, alumina, glass beads, styrenic polymer particles, divinylbenzene-based polymer particles, methacrylic polymer particles, ethylenic polymer particles, and propylenic polymer particles, and "modifiers" such as auxiliary polymerization initiators, antioxidants, leveling agents, wettability improvers, surfactants, plasticizers, and ultraviolet absorbers.

Addition of "silane coupling agents" is effective for further improvement of the adhesive properties of the curable resin compositions of this invention. Examples of such silane coupling agents include epoxysilanes such as γ-glycidoxypropyltrimethoxysilane, γ-glycidoxypropylmethyldiethoxysilane, and β-(3,4-epoxycyclohexyl)ethyltrimethoxysilane, aminosilanes such as N-β(aminoethyl)-γ-aminopropyltrimethoxysilane, γ-aminopropyltriethoxysilane, and N-phenyl-γ-aminopropyltrimethoxysilane, and mercaptosilanes such as γ-mercaptosilane; examples further include methyltrimethoxysilane and methyltriethoxysilane.

According to this invention, a curable resin composition comprising a silicone resin containing radically reactive groups and a radical polymerization initiator is cured by heating or photoirradiation to yield a molded article. In the case where a silicone resin copolymer (molded article) is obtained by heating, the molding temperature can be selected from a wide range from room temperature to around 200° C. by selecting suitable thermal polymerization initiators and accelerators. The curable resin composition is allowed to polymerize and cure in a mold or on a steel belt in a prescribed manner to yield a molded silicone resin article in the desired shape to suit a specific application or purpose of the molded article to be produced.

In the case where a silicone resin copolymer (molded article) is produced by photoirradiation, a curable resin composition is irradiated with ultraviolet light of wavelength 10-400 nm or with visible light of wavelength 400-700 nm to yield a molded article. The wavelength of the light in use is not specifically limited and near ultraviolet light of wavelength 200-400 nm is used advantageously. Examples of the lamps for generating ultraviolet light include low-pressure mercury lamp (output, 0.4-4 W/cm), high-pressure mercury lamps (output, 40-160 W/cm), ultrahigh-pressure mercury lamps (output, 173-435 W/cm), metal halide lamps (output, 80-160 W/cm), pulse xenon lamps (output, 80-120 W/cm), and electrodeless discharge lamps (output, 80-120 W/cm). As each of these lamps shows its own characteristic spectral distribution, the candidate is selected to suit the kind of photopolymerization initiator to be used.

An example of the photoirradiation processes for producing a silicone resin copolymer is presented below. A curable resin composition is injected into a mold which has a cavity of arbitrary shape and is constructed of a transparent material such as quartz glass, irradiated with ultraviolet light using one of the aforementioned mercury lamps to effect polymerization and curing, and released from the mold to yield a molded article of the desired shape. In the case where the process does not use a mold, a curable resin composition is applied, for example, to a moving steel belt using a doctor blade or a roll coater and is polymerized and cured by ultraviolet irradiation using one of the aforementioned mercury lamps to yield a molded article in the form of a sheet. However, the processes for producing molded articles, whether based on curing by heat or photoirradiation, are not limited to the examples described above.

The silicone resin copolymer (molded article) of this invention obtained in the aforementioned manner shows low modulus of elasticity, high elongation, excellent flexibility, and good toughness. Moreover, it transmits 88% or more, in some cases 90% or more, of visible light of a wavelength of 550 nm and this suggests the feasibility of its application to optical materials. Still further, it does not turn yellow even at high temperatures. Specifically, the molded article shows the following properties: (i) the modulus of elasticity at 25° C. is 0.01-1,000 MPa; (ii) the elongation determined with the distance between chucks set at 25-50 mm and the test speed at 5-50 mm/min is 10-500%; (iii) the transmission of light at 550 nm is 88-94%; and (iv) the Coefficient of Thermal Expansion (CTE) is 100-1,000 ppm/K.

Effects of the Invention

According to this invention, it is possible to introduce selectively a variety of functional groups to a silicone polymer containing SiH groups simply and surely under mild conditions, and introduction of radically reactive groups in this manner provides a silicone resin which cures rapidly by ultraviolet irradiation. Moreover, the silicone resin is combined with a radical polymerization initiator to formulate a resin composition which cures in a short time to yield a molded article with excellent heat resistance, transparency, flexibility, and impact resistance.

PREFERRED EMBODIMENTS OF THE INVENTION

This invention will be explained in detail below with reference to the examples and comparative examples, but will not be limited thereto.

EXAMPLES

Example 1

In a reaction vessel equipped with a stirrer and a thermometer were placed 27 ml of toluene, 0.95 g of N,N-diethylhydroxylamine, and 22.01 g of an organohydrogenpolysiloxane represented by the following structural formula (i) (wherein R is a methyl group, s=7, and m=73). To the reaction vessel was added dropwise a toluene solution of 3.49 g of a polysiloxane containing hydroxyl groups at both ends represented by the following structural formula (ii) (wherein R is a methyl group and n=35) over 5 minutes with stirring at room temperature. Upon completion of the dropwise addition of the polysiloxane containing hydroxyl groups at both ends, the reaction solution was heated at 50° C. and stirred for 5 minutes, then 9.00 g of 2-hydroxyethyl methacrylate was added dropwise, and the reaction solution was stirred for 6.5 hours. The reaction solution was washed with an aqueous citric acid solution and water until the solution became neutral and was then dehydrated by anhydrous magnesium sulfate. The anhydrous magnesium sulfate was filtered off and the filtrate was concentrated to yield 27 g (90% recovery) of a silicone resin containing radically reactive groups. The silicone resin thus obtained will be referred to as silicone resin A.

Figure 1:
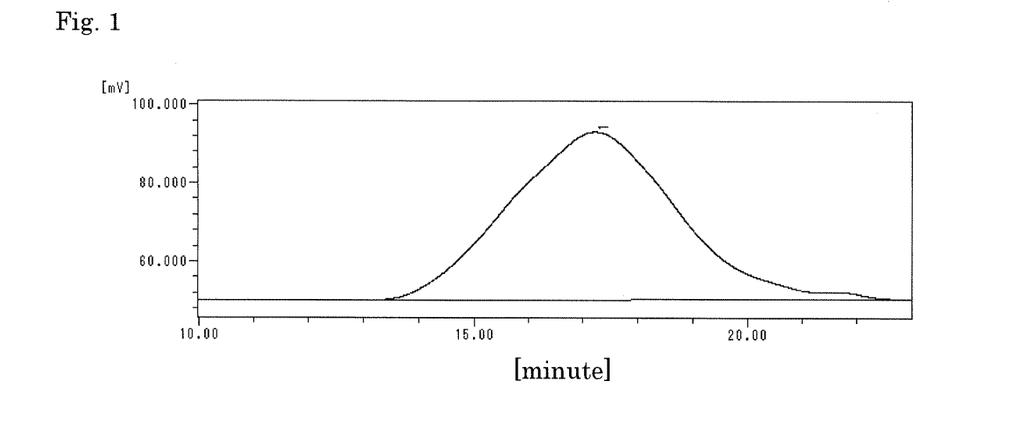
FIG. 1 shows a GPC chart of silicone resin A obtained in Example 1.

Silicone resin A obtained above was a colorless viscous liquid soluble in a variety of organic solvents. The disappearance of the peak assignable to the SiH group was confirmed by $^1$H-NMR analysis. The numbers of repeating structural units (s, m, n) of the organohydrogenpolysiloxane and the polysiloxane containing hydroxyl groups used in the reaction, the molar ratio of N,N-diethylhydroxylamine to the SiH group of the organohydrogenpolysiloxane, and the rate of introduction of the methacryl group to the silicone resin obtained are shown in Table 1. The rate of introduction of the methacryl group was calculated from the ratio of the peaks assignable to the silicone resin and the raw materials in $^1$H-NMR analysis. Furthermore, a GPC chart of the silicone resin obtained is shown in FIG. 1. As is apparent from FIG. 1, a resin with an Mw of 38,000 is obtained here.

Example 2

In a reaction vessel equipped with a stirrer and a thermometer were placed 92 ml of toluene, 0.83 g of N,N-diethylhydroxylamine, and 19.17 g of an organohydrogenpolysiloxane represented by the following structural formula (i) (wherein R is a methyl group, s=7, and m=73). To the reaction vessel was added dropwise a toluene solution of 78.27 g of a polysiloxane containing hydroxyl groups at both ends represented by the following structural formula (iii) (wherein R is a methyl group and n=659) over 5 minutes with stirring at room temperature. Upon completion of the dropwise addition of the polysiloxane containing hydroxyl groups at both ends, the reaction solution was heated at 50° C. and stirred for 5 minutes, then 7.83 g of 2-hydroxyethyl methacrylate was added dropwise, and the reaction solution was stirred for 7 hours. The reaction solution was washed with an aqueous citric acid solution and water until the solution became neutral and was then dehydrated by anhydrous magnesium sulfate. The anhydrous magnesium sulfate was filtered off and the filtrate was concentrated to yield 95 g (95% recovery) of a silicone resin containing radically reactive groups. The silicone resin thus obtained will be referred to as silicone resin B.

Figure 2:
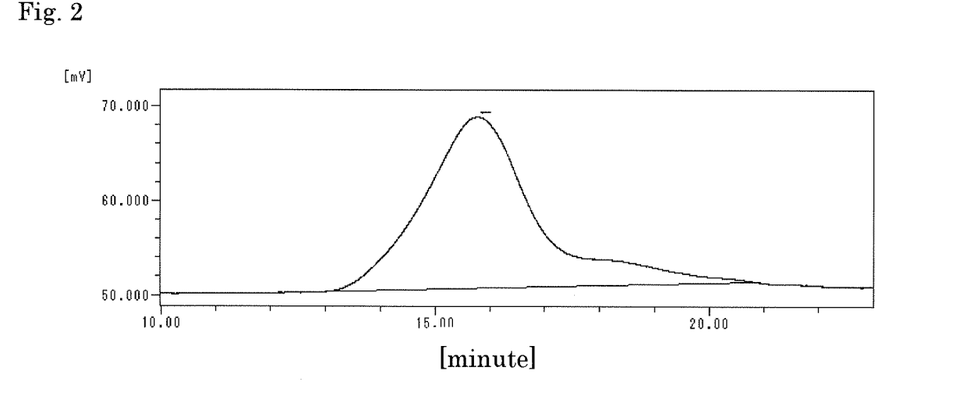
FIG. 2 shows a GPC chart of silicone resin B obtained in Example 2.

Silicone resin B obtained above was a colorless viscous liquid soluble in a variety of organic solvents. The disappearance of the peak assignable to the SiH group was confirmed by $^1$H-NMR analysis. The numbers of repeating structural units (s, m, n) of the organohydrogenpolysiloxane and the polysiloxane containing hydroxyl groups used in the reaction, the molar ratio of N,N-diethylhydroxylamine to the SiH group of the organohydrogenpolysiloxane, and the rate of introduction of the methacryl group to the silicone resin obtained are shown in Table 1. The rate of introduction of the methacryl group was calculated from the ratio of the peaks assignable to the silicone resin and the raw materials in $^1$H-NMR analysis. Furthermore, a GPC chart of the silicone resin obtained is shown in FIG. 2. As is apparent from FIG. 2, a resin with an Mw of 100,000 is obtained here.

Example 3

In a reaction vessel equipped with a stirrer and a thermometer were placed 9.11 g of a polysiloxane containing hydroxyl groups at both ends represented by the following structural formula (iv) (wherein R is a methyl group and n=1,872) and 18 ml of toluene. To the reaction vessel was added dropwise a mixture of a toluene solution of 0.97 g of an organohydrogenpolysiloxane represented by the following structural formula (i) (wherein R is a methyl group, s=7, and m=73) and 0.034 g of N,N-diethylhydroxylamine with stirring at room temperature. The reaction solution was heated at 70° C. and stirred for 5 minutes, then 0.32 g of 2-hydroxyethyl methacrylate was added dropwise, and the reaction solution was stirred for 7 hours. The reaction solution was washed with an aqueous citric acid solution and water until the solution became neutral and was then dehydrated by anhydrous magnesium sulfate. The anhydrous magnesium sulfate was filtered off and the filtrate was concentrated to yield 7 g (70% recovery) of a silicone resin containing radically reactive groups. The silicone resin thus obtained will be referred to as silicone resin C.

Figure 3:
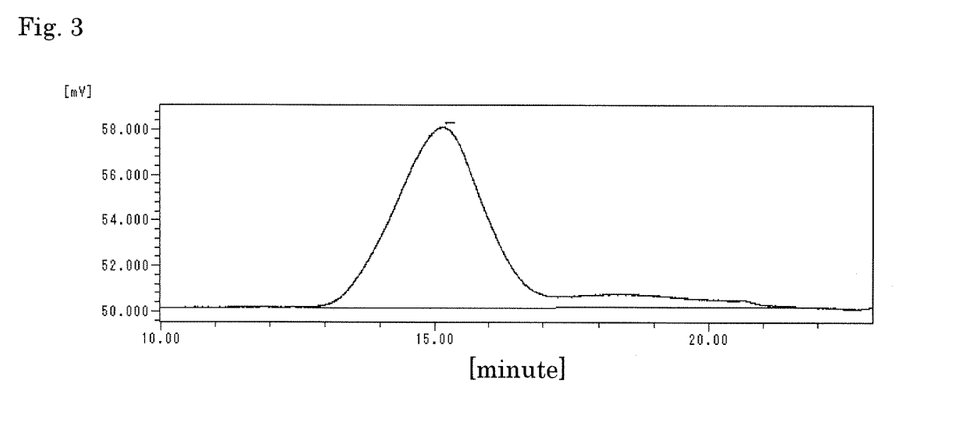
FIG. 3 shows a GPC chart of silicone resin C obtained in Example 3.

Silicone resin C obtained above was a colorless viscous liquid soluble in a variety of organic solvents. The disappearance of the peak assignable to the SiH group was confirmed by $^1$H-NMR analysis. The numbers of repeating structural units (s, m, n) of the organohydrogenpolysiloxane and the polysiloxane containing hydroxyl groups used in the reaction, the molar ratio of N,N-diethylhydroxylamine to the SiH group of the organohydrogenpolysiloxane, and the rate of introduction of the methacryl group to the silicone resin obtained are shown in Table 1. The rate of introduction of the methacryl group was calculated from the ratio of the peaks assignable to the silicone resin and the raw materials in $^1$H-NMR analysis. Furthermore, a GPC chart of the silicone resin obtained is shown in FIG. 3. As is apparent from FIG. 3, a resin with an Mw of 160,000 is obtained here.

Example 4

In a reaction vessel equipped with a stirrer and a thermometer were placed 30 ml of toluene, 0.18 g of N,N-diethylhydroxylamine, and 0.32 g of an organohydrogenpolysiloxane represented by the following structural formula (v) (wherein R is a methyl group, s=30, and m=0). To the reaction vessel was added dropwise a toluene solution of 4.05 g of a polysiloxane containing hydroxyl groups at both ends represented by the following structural formula (iii) (wherein R is a methyl group and n=659) over 5 minutes with stirring at room temperature. Upon completion of the dropwise addition of the polysiloxane containing hydroxyl groups at both ends, the reaction solution was stirred for 5 minutes, then 1.87 g of 2-hydroxyethyl methacrylate was added dropwise, and the reaction solution was stirred at 70° C. for 7 hours. The reaction solution was washed with an aqueous citric acid solution and water until the solution became neutral and was then dehydrated by anhydrous magnesium sulfate. The anhydrous magnesium sulfate was filtered off and the filtrate was concentrated to yield 4 g (80% recovery) of a silicone resin containing radically reactive groups. The silicone resin thus obtained will be referred to as silicone resin D.

Figure 4:
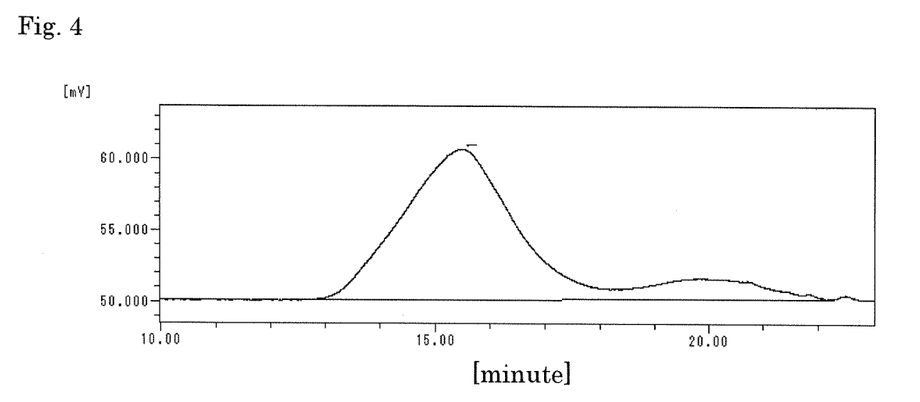
FIG. 4 shows a GPC chart of silicone resin D obtained in Example 4.

Silicone resin D obtained above was a colorless viscous liquid soluble in a variety of organic solvents. The disappearance of the peak assignable to the SiH group was confirmed by $^1$H-NMR analysis. The numbers of repeating structural units (s, m, n) of the organohydrogenpolysiloxane and the polysiloxane containing hydroxyl groups used in the reaction, the molar ratio of N,N-diethylhydroxylamine to the SiH group of the organohydrogenpolysiloxane, and the rate of introduction of the methacryl group to the silicone resin obtained are shown in Table 1. The rate of introduction of the methacryl group was calculated from the ratio of the peaks assignable to the silicone resin and the raw materials in $^1$H-NMR analysis. Furthermore, a GPC chart of the silicone resin obtained is shown in FIG. 4. As is apparent from FIG. 4, a resin with an Mw of 130,000 is obtained here.

Example 5

In a reaction vessel equipped with a stirrer and a thermometer were placed 120 ml of toluene, 0.82 g of N,N-diethylhydroxylamine, 1.2 g of an organohydrogenpolysiloxane represented by the following structural formula (v) (wherein R is a methyl group, s=30, and m=0), and 1.2 g of an organohydrogenpolysiloxane represented by the following structural formula (vi) (wherein R is a methyl group, s=8, and m=16). To the reaction vessel was added dropwise a toluene solution of 4.9 g of a polysiloxane containing hydroxyl groups at both ends represented by the following structural formula (iii) (wherein R is a methyl group and n=659) and 1.38 g of a polysiloxane containing hydroxyl groups at both ends represented by the following structural formula (vii) (wherein R is a methyl group and n=35) over 5 minutes with stirring at room temperature. Upon completion of the dropwise addition of the polysiloxanes containing hydroxyl groups at both ends, the reaction solution was heated at 50° C. and stirred for 5 minutes, then 8.5 g of 2-hydroxyethyl methacrylate was added dropwise, and the reaction solution was stirred for 4 hours. The reaction solution was washed with an aqueous citric acid solution and water until the solution became neutral and was then dehydrated by anhydrous magnesium sulfate. The anhydrous magnesium sulfate was filtered off and the filtrate was concentrated to yield 9 g (80% recovery) of a silicone resin containing radically reactive groups. The silicone resin thus obtained will be referred to as silicone resin E.

Figure 5:
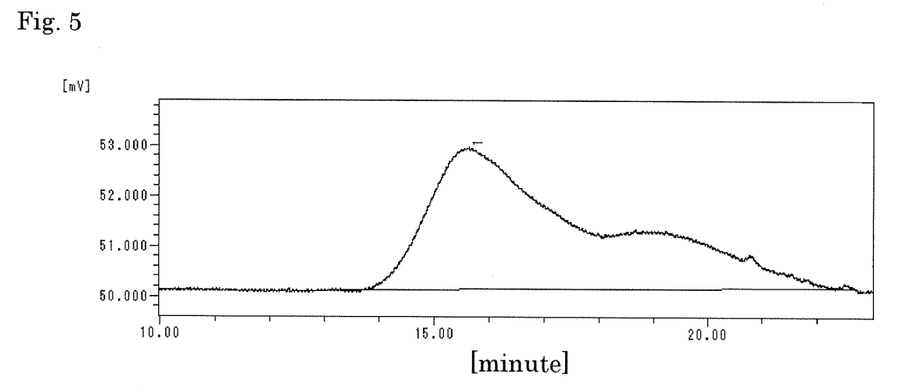
FIG. 5 shows a GPC chart of silicone resin E obtained in Example 5.

Silicone resin E obtained above was a colorless viscous liquid soluble in a variety of organic solvents. The disappearance of the peak assignable to the SiH group was confirmed by $^1$H-NMR analysis. The numbers of repeating structural units (s, m, n) of the organohydrogenpolysiloxanes and the polysiloxanes containing hydroxyl groups used in the reaction, the molar ratio of N,N-diethylhydroxylamine to the SiH group of the organohydrogenpolysiloxanes, and the rate of introduction of the methacryl group to the silicone resin obtained are shown in Table 1. The rate of introduction of the methacryl group was calculated from the ratio of the peaks assignable to the silicone resin and the raw materials in $^1$H-NMR analysis. Furthermore, a GPC chart of the silicone resin obtained is shown in FIG. 5. As is apparent from FIG. 5, a resin with an Mw of 64,000 is obtained here.

Example 6

In a reaction vessel equipped with a stirrer and a thermometer were placed 30 of toluene, 1.09 g of N,N-diethylhydroxylamine, 1.6 g of an organohydrogenpolysiloxane represented by the following structural formula (v) (wherein R is a methyl group, s=30, and m=0), and 1.56 g of an organohydrogenpolysiloxane represented by the following structural formula (vi) (wherein R is a methyl group, s=8, and m=16). To the reaction vessel was added dropwise a toluene solution of 4.9 g of a polysiloxane containing hydroxyl groups at both ends represented by the following structural formula (iii) (wherein R is a methyl group and n=659), 1.38 g of a polysiloxane containing hydroxyl groups at both ends represented by the following structural formula (vii) (wherein R is a methyl group and n=35), 1.8 g of a polysiloxane containing hydroxyl groups at both ends represented by the following structural formula (viii) (wherein R is a methyl group and n=241), and 2.6 g of a polysiloxane containing hydroxyl groups at both ends represented by the following structural formula (ix) (wherein R is a methyl group and n=348) over 5 minutes with stirring at room temperature. Upon completion of the dropwise addition of the polysiloxanes containing hydroxyl groups at both ends, the reaction solution was heated at 50° C. and stirred for 5 minutes, then 11.30 g of 2-hydroxyethyl methacrylate was added dropwise, and the reaction solution was stirred for 4 hours. The reaction solution was washed with an aqueous citric acid solution and water until the solution became neutral and was then dehydrated by anhydrous magnesium sulfate. The anhydrous magnesium sulfate was filtered off and the filtrate was concentrated to yield 16 g (92% recovery) of a silicone resin containing radically reactive groups. The silicone resin thus obtained will be referred to as silicone resin F.

Figure 6:
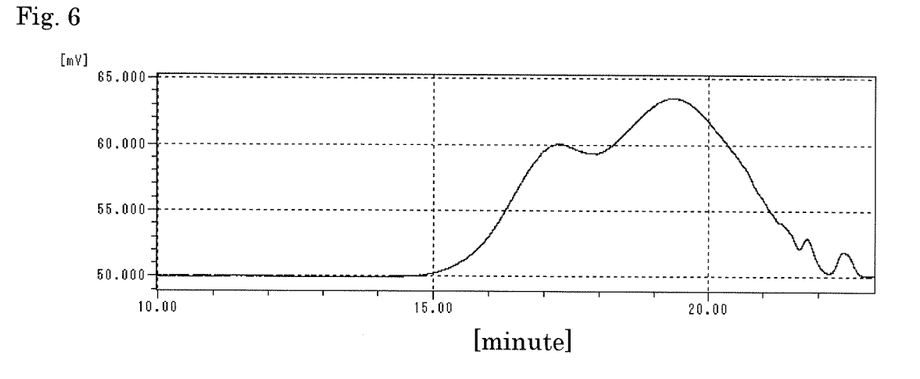
FIG. 6 shows a GPC chart of silicone resin F obtained in Example 6.

Silicone resin F obtained above was a colorless viscous liquid soluble in a variety of organic solvents. The disappearance of the peak assignable to the SiH group was confirmed by $^1$H-NMR analysis. The numbers of repeating structural units (s, m, n) of the organohydrogenpolysiloxanes and the polysiloxanes containing hydroxyl groups used in the reaction, the molar ratio of N,N-diethylhydroxylamine to the SiH group of the organohydrogenpolysiloxanes, and the rate of introduction of the methacryl group to the silicone resin obtained are shown in Table 1. The rate of introduction of the methacryl group was calculated from the ratio of the peaks assignable to the silicone resin and the raw materials in $^1$H-NMR analysis. Furthermore, a GPC chart of the silicone resin obtained is shown in FIG. 6. As is apparent from FIG. 6, a resin with an Mw of 29,000 is obtained here.

Example 7

In a reaction vessel equipped with a stirrer and a thermometer were placed 200 ml of toluene, 1.81 g of N,N-diethylhydroxylamine, 2.97 g of an organohydrogenpolysiloxane represented by the following structural formula (v) (wherein R is a methyl group, s=30, and m=0), and 1.49 g of an organohydrogenpolysiloxane represented by the following structural formula (vi) (wherein R is a methyl group, s=8, and m=16).

To the reaction vessel was added dropwise a toluene solution of 0.71 g of a polysiloxane containing hydroxyl groups at both ends represented by the following structural formula (iii) (wherein R is a methyl group and n=659), 2.98 g of a polysiloxane containing hydroxyl groups at both ends represented by the following structural formula (vii) (wherein R is a methyl group and n=35), 0.26 g of a polysiloxane containing hydroxyl groups at both ends represented by the following structural formula (viii) (wherein R is a methyl group and n=241), and 0.38 g of a polysiloxane containing hydroxyl groups at both ends represented by the following structural formula (ix) (wherein R is a methyl group and n=348) over 5 minutes with stirring at room temperature. Upon completion of the dropwise addition of the polysiloxanes containing hydroxyl groups at both ends, the reaction solution was heated at 50° C. and stirred for 5 minutes, then 18.97 g of 2-hydroxyethyl methacrylate was added dropwise, and the reaction solution was stirred for 4 hours. The reaction solution was washed with an aqueous citric acid solution and water until the solution became neutral and was then dehydrated by anhydrous magnesium sulfate. The anhydrous magnesium sulfate was filtered off and the filtrate was concentrated to yield 14 g (93% recovery) of a silicone resin containing radically reactive groups. The silicone resin thus obtained will be referred to as silicone resin G.

Figure 7:
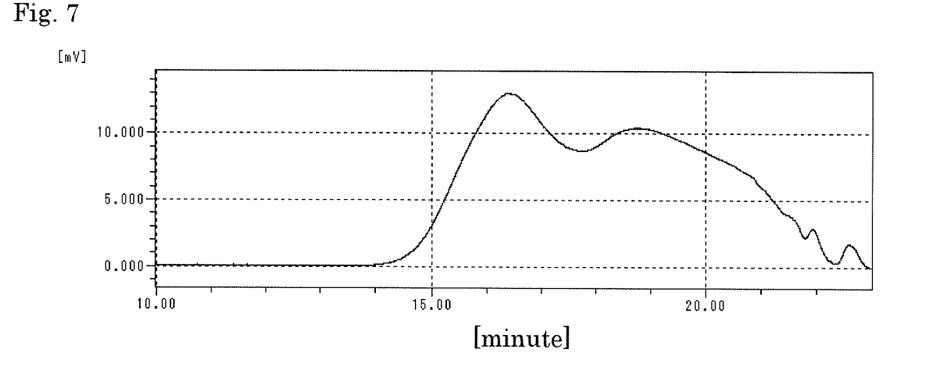
FIG. 7 shows a GPC chart of silicone resin G obtained in Example 7.

Silicone resin G obtained above was a colorless viscous liquid soluble in a variety of organic solvents. The disappearance of the peak assignable to the SiH group was confirmed by $^1$H-NMR analysis. The numbers of repeating structural units (s, m, n) of the organohydrogenpolysiloxanes and the polysiloxanes having hydroxyl groups, the molar ratio of N,N-diethylhydroxylamine to the SiH group of the organohydrogenpolysiloxanes, and the rate of introduction of the methacryl group to the silicone resin obtained are shown in Table 1. The rate of introduction of the methacryl group was calculated from the ratio of the peaks assignable to the silicone resin and the raw materials in ¹H-NMR analysis. Furthermore, a GPC chart of the silicone resin obtained is shown in FIG. 7. As is apparent from FIG. 7, a resin with an Mw of 11,000 is obtained here.

Comparative Example 1

In a reaction vessel equipped with a stirrer and a thermometer were placed 5 ml of toluene and 0.96 g of an organohydrogenpolysiloxane represented by the following general formula (i) (wherein R is a methyl group, s=7, and m=73). To the reaction vessel was added dropwise a toluene solution of 3.91 g of a polysiloxane containing hydroxyl groups at both ends represented by the following general formula (iii) (wherein R is a methyl group and n=659) over 5 minutes with stirring at room temperature. Upon completion of the dropwise addition of the polysiloxane containing hydroxyl groups at both ends, the reaction solution was heated at 50° C. and stirred for 4 hours. However, the peak assignable to the SiH group did not disappear in the ¹H-NMR analysis, that is, the reaction did not proceed.

Comparative Example 2

In a reaction vessel equipped with a stirrer and a thermometer were placed 5 ml of toluene, 0.042 g of N,N-diethylhydroxylamine, and 0.96 g of an organohydrogenpolysiloxane represented by the following general formula (i) (wherein R is a methyl group, s=7, and m=73). To the reaction vessel was added dropwise a toluene solution of 3.91 g of a polysiloxane containing hydroxyl groups at both ends represented by the following general formula (iii) (wherein R is a methyl group and n=659) over 5 minutes with stirring at room temperature. Upon completion of the dropwise addition of the polysiloxane containing hydroxyl groups at both ends, the reaction solution was heated at 50° C. and stirred for 6 hours, and then left standing for 2 days. The reaction solution gelled and became insoluble in solvents.

Comparative Example 3

In a reaction vessel equipped with a stirrer and a thermometer were placed 200 ml of toluene, 7.32 g of N,N-diethylhydroxylamine, and 13.6 g of an organohydrogenpolysiloxane represented by the following general formula (v) (wherein R is a methyl group, s=30, and m=0). To the reaction vessel was added dropwise 29.39 g of 2-hydroxyethyl methacrylate with stirring at room temperature and the stirring was continued for 2 hours. The reaction solution was washed with an aqueous citric acid solution and water until the solution became neutral and then dehydrated by anhydrous magnesium sulfate. The anhydrous magnesium sulfate was filtered off and the filtrate was concentrated to yield a curable silicone resin containing radically reactive groups. This silicone resin was a colorless viscous liquid soluble in a variety of organic solvents. The resin thus obtained will be referred to as silicone resin H.

Comparative Example 4

In a reaction vessel equipped with a stirrer and a thermometer were placed 32 ml of toluene, 1.12 g of N,N-diethylhydroxylamine, and 25.96 g of an organohydrogenpolysiloxane represented by the following general formula (i) (wherein R is a methyl group, s=7, and m=73). To the reaction vessel was added dropwise 12.30 g of 2-hydroxyethyl methacrylate with stirring at room temperature and the stirring was continued for 10 hours. The reaction solution was washed with an aqueous citric acid solution and water until the solution became neutral and then dehydrated by anhydrous magnesium sulfate. The anhydrous magnesium sulfate was filtered off and the filtrate was concentrated to yield a curable silicone resin containing radically reactive groups. This silicone resin was a colorless viscous liquid soluble in a variety of organic solvents. The resin thus obtained will be referred to as silicone resin I.

TABLE 1

| | Example | | | | | | | Comparative example | | | |
|---|---|---|---|---|---|---|---|---|---|---|---|
| | 1 | 2 | 3 | 4 | 5 | 6 | 7 | 1 | 2 | 3 | 4 |
| s | 7 | 7 | 7 | 30 | 19 | 19 | 23 | 7 | 7 | 30 | 7 |
| m | 73 | 73 | 73 | 0 | 4 | 8 | 5 | 73 | 73 | 0 | 73 |
| n | 35 | 659 | 1872 | 659 | 139 | 179 | 50 | 659 | 659 | 0 | 0 |
| Molar ratio of amine to SiH group | 0.4 | 0.4 | 0.4 | 0.4 | 0.4 | 0.4 | 0.4 | 0 | 2 | 0.4 | 0.4 |
| Rate of introduction of methacryl group [%] | 87 | 69 | 73 | 50 | 70 | 98 | 99 | 0 | Gelation | 90 | 90 |

Example 8

A transparent silicone resin composition (curable resin composition) was obtained by mixing 100 parts by weight of silicone resin A prepared in the aforementioned Example 1 and 2.5 parts by weight of 1-hydroxycyclohexyl phenyl ketone as a photopolymerization initiator.

The curable resin composition obtained above was sandwiched between two glass plates, each with a thickness of 10 mm, and cured by photoirradiation for 30 seconds using a mercury lamp at an integrated exposure dose of 6,400 mJ/cm² to yield a molded silicone resin article in the form of a sheet measuring 200×200×0.4 mm.

Examples 9-13 and Comparative Examples 5-6

Molded silicone resin articles were obtained as in Example 8 with the exception of using the silicone resins and photopolymerization initiators shown in Table 2.

The properties of the molded articles obtained in the aforementioned Examples 8-13 and Comparative Examples 5-6 are evaluated and the results are shown in Table 2. In Table 2, the symbol J stands for 1-hydroxycyclohexyl phenyl ketone (polymerization initiator) and for 2-hydroxy-2-methyl-1-phenyl-propan-1-one (polymerization initiator) and the numerical values given in the columns for J and K respectively mean the amount added in part by weight to 100 parts by weight of the polymerizable components. The numbers s, m, and n denote the numbers of structural units in the molecules of the following structural formulas used in the production of the silicone resins. Further, CTE denotes the coefficient of linear thermal expansion between 50° C. and 150° C.

The properties of the molded articles were evaluated by the following methods.

(1) Modulus of elasticity and elongation: The modulus of elasticity and the elongation of each molded article were measured with the aid of a tensile tester (RTE-1210 manufactured by Orientec Co., Ltd.) at 25° C. The molded articles obtained in Example 8 and Comparative Examples 5 and 6 were respectively tested with the distance between chucks set at 50 mm and the test speed set at 5 mm/min. The molded articles obtained in Examples 9-13 were respectively tested with the distance between chucks set at 25 mm and the test speed set at 50 mm/min.

(2) Light transmission: The specimen (molded article) with a thickness of 0.4 mm was tested for transmission of light at a wavelength of 550 nm with the aid of a testing device, U4000, manufactured by Hitachi, Ltd.

(3) CTE: The coefficient of linear expansion was measured by thermomechanical analysis at a rate of temperature rise of 5° C./min.

TABLE 2

| | Example | | | | | | Comparative example | |
|---|---|---|---|---|---|---|---|---|
| | 8 | 9 | 10 | 11 | 12 | 13 | 5 | 6 |
| Silicone resin | A | B | D | E | F | G | H | I |
| s | 7 | 7 | 30 | 19 | 19 | 23 | 30 | 7 |
| m | 73 | 73 | 0 | 4 | 8 | 5 | 0 | 73 |
| n | 35 | 659 | 659 | 139 | 179 | 50 | 0 | 0 |
| J | 2.5 | | | | | | 2.5 | 2.5 |
| K | | 0.1 | 0.1 | 1.0 | 1.0 | 1.0 | | |
| Modulus of elasticity [MPa] | 5 | 0.2 | 1 | 15 | 20 | 240 | 1311 | 9 |
| Elongation [%] | 20 | 330 | 200 | 50 | 20 | 10 | 3 | 7 |
| Light transmission at 550 nm [%] | 91 | 91 | 90 | 90 | 92 | 92 | 91 | 92 |
| CTE [ppm/K] | 293 | 710 | 500 | 260 | 260 | 190 | 121 | 300 |

INDUSTRIAL APPLICABILITY

The silicone resin of this invention possesses a silicone chain to which arbitrarily long silicone chains and an arbitrary number and kind of curable functional groups are introduced selectively so that the resin can yield a cured product with excellent flexibility, toughness, heat resistance, and transparency and the cured product is useful for a variety of applications. More particularly, the silicone resin of this invention possesses characteristics of both silicone resins and acrylic resins, that is, excellent flexibility and heat resistance of the former and rapid curability of the latter. Therefore, a resin composition formulated from the silicone resin of this invention and a radical polymerization catalyst is capable of curing in a short time to produce a molded article with excellent heat resistance, transparency, flexibility, and impact resistance. The molded article thus obtained can be used in a variety of applications; for example, in optical applications such as touch panel bases, flat panel display bases, lenses, optical disks, and optical fibers, in various transport machines, and in housing as window materials. Furthermore, since the molded article can be obtained as a lightweight transparent article, it can be used as a substitute for glass which has hitherto been used in a wide variety of applications. Thus, the silicone resin of this invention is of high industrial utility.

The invention claimed is:

1. A silicone resin containing radically reactive groups represented by the following general formula (1):

(1)

wherein R is an alkyl group of 1-12 carbon atoms optionally containing an oxygen atom or an aryl group, $0<l\leq 100$, $0<m\leq 1,000$, $0<n\leq 2,000$, $0<o<100-l$, $p\geq 0$, $q\leq 100-l-o$, and X is a monovalent group containing at least 1 unsaturated linkage represented by the following general formula (2);

(2)

wherein Y is a hydrocarbon group of 1-12 carbon atoms optionally containing an oxygen atom, Z is a (meth)acryloyl group, a vinyl group, or an allyl group, and r is a number expressed as $1\leq r\leq 6$;

wherein the silicone resin is produced by a process comprising reacting an organopolysiloxane containing SiH groups represented by the following general formula (3)

(3)

wherein R is an alkyl group of 1-12 carbon atoms optionally containing an oxygen atom or an aryl group, and s and m are numbers respectively expressed as $0<s\leq 100$ and $0<m\leq 1,000$, in the presence of a hydroxylamine compound represented by the following general formula (4)

(4)

wherein $R^1$ is an alkyl group with an organopolysiloxane containing hydroxyl groups at both ends represented by the following general formula (5)

(5)

wherein R is an alkyl group of 1-12 carbon atoms optionally containing an oxygen atom or an aryl group, and n is a number expressed as $0<n\leq 2,000$, and with an alcohol containing radically reactive groups represented by the following general formula (6)

(6)

wherein Y is a hydrocarbon group of 1-12 carbon atoms optionally containing oxygen atom, Z is a (meth)acryloyl group, a vinyl group, or an allyl group, and r is a number expressed as $1\leq r\leq 6$.

2. A curable resin composition comprising the curable silicone resin of claim 1 and a radical polymerization initiator.

3. A molded silicone resin article obtained by radical copolymerization of the curable resin composition described in claim 2.

4. A molded silicone resin article as described in claim 3 which satisfies the following conditions (i) to (iv):
(i) modulus of elasticity at 25° C.: 0.01-1,000 MPa
(ii) elongation at distance between chucks, 25-50 mm, test speed, 5-50 mm/min: 10-50%
(iii) light transmission at 550 nm: 88-94%
(iv) coefficient of liner thermal expansion: 100-1,000 ppm/K.

* * * * *